(12) United States Patent
Sherwin

(10) Patent No.: US 9,297,491 B2
(45) Date of Patent: Mar. 29, 2016

(54) THERMALLY RESISTANT CONVOLUTED SLEEVE AND METHOD OF CONSTRUCTION THEREOF

(71) Applicant: Federal-Mogul Powertrain, Inc., Southfield, MI (US)

(72) Inventor: Michael J. Sherwin, Bay Village, OH (US)

(73) Assignee: Federal-Mogul Powertrain, Inc., Southfield, MI (US)

( * ) Notice: Subject to any disclaimer, the term of this patent is extended or adjusted under 35 U.S.C. 154(b) by 248 days.

(21) Appl. No.: 13/710,148

(22) Filed: Dec. 10, 2012

(65) Prior Publication Data

US 2013/0199656 A1 Aug. 8, 2013

Related U.S. Application Data

(60) Provisional application No. 61/596,426, filed on Feb. 8, 2012.

(51) Int. Cl.
*F16L 11/00* (2006.01)
*F16L 59/02* (2006.01)
(Continued)

(52) U.S. Cl.
CPC .............. *F16L 59/029* (2013.01); *B32B 37/14* (2013.01); *F16L 11/11* (2013.01); *H02G 3/0468* (2013.01); *Y10T 156/1043* (2015.01)

(58) Field of Classification Search
CPC ..... F16L 59/029; F16L 11/11; H02G 3/0468; Y10T 156/1043
USPC ......... 138/121, 140, 141, 143, 144, 149, 150, 138/137, 122, 125, 129, 134
See application file for complete search history.

(56) References Cited

U.S. PATENT DOCUMENTS 427,659 A * 5/1890 Bayles ...................... F16L 9/14
138/140
4,039,740 A * 8/1977 Iwata ...................... H01B 12/02
174/120 FP
(Continued)

FOREIGN PATENT DOCUMENTS

CN 86102721 A 9/1986
DE 102010003916 A1 * 10/2011
(Continued)

OTHER PUBLICATIONS

English Translation of Dowe, DE 102010003916, Aug. 20, 2014.*
(Continued)

*Primary Examiner* — J. Casimer Jacyna
*Assistant Examiner* — Benjamin R Shaw
(74) *Attorney, Agent, or Firm* — Robert L. Stearns; Dickinson Wright, PLLC

(57) ABSTRACT

A thermally insulative, reflective convoluted sleeve and method of construction thereof is provided. The sleeve includes a resilient inner layer, an outer layer and a resilient intermediate layer sandwiched between the inner and outer layers. The inner layer has an inner surface exposed to an inner cavity of the sleeve and the outer layer has an outer reflective surface exposed to the surrounding environment. The intermediate layer is an impervious sheet material and is sandwiched in abutment with the inner and outer layers. The inner, outer and intermediate layers are convoluted to provide the sleeve with enhanced thermal protection properties and flexibility.

21 Claims, 2 Drawing Sheets

(51) Int. Cl.
*B32B 37/14* (2006.01)
*F16L 11/11* (2006.01)
*H02G 3/04* (2006.01)

(56) References Cited

U.S. PATENT DOCUMENTS

| | | | | |
|---|---|---|---|---|
| 4,238,260 | A * | 12/1980 | Washkewicz | B29C 47/023 138/125 |
| 4,380,253 | A * | 4/1983 | Mead | F16L 59/029 138/103 |
| 4,431,469 | A | 2/1984 | Falcomato | |
| 4,445,543 | A * | 5/1984 | Mead | F16L 59/141 138/122 |
| 4,488,577 | A * | 12/1984 | Shilad | F16L 59/153 138/103 |
| 5,349,988 | A | 9/1994 | Walsh et al. | |
| 5,660,899 | A * | 8/1997 | Rockney | F16L 11/118 138/122 |
| 5,843,542 | A | 12/1998 | Brushafer et al. | |
| 6,309,721 | B1 | 10/2001 | Gladfelter et al. | |
| 6,897,375 | B2 | 5/2005 | Lindner | |
| 6,935,378 | B2 | 8/2005 | Ikemoto et al. | |
| 7,004,201 | B2 * | 2/2006 | Arima | F16L 11/112 138/121 |
| 7,055,553 | B2 * | 6/2006 | Bessette | B32B 1/08 138/133 |
| 7,410,550 | B2 | 8/2008 | Sherwin | |
| 7,624,762 | B2 | 12/2009 | Cohen et al. | |
| 7,939,764 | B2 * | 5/2011 | Gottfried | H01B 3/443 174/110 R |
| 8,568,844 | B2 * | 10/2013 | Whitaker | F16L 59/021 138/149 |
| 2001/0030054 | A1 * | 10/2001 | Goett | H02G 3/0468 174/106 R |
| 2004/0099324 | A1 * | 5/2004 | Fraser | F16L 11/04 138/129 |
| 2004/0182463 | A1 * | 9/2004 | Bessette | B32B 1/08 138/143 |
| 2004/0219846 | A1 | 11/2004 | Sellis et al. | |
| 2005/0126651 | A1 * | 6/2005 | Sherwin | F16L 59/021 138/127 |
| 2006/0054235 | A1 * | 3/2006 | Cohen | B32B 15/08 138/149 |
| 2007/0125439 | A1 * | 6/2007 | Quigley | B32B 1/08 138/137 |
| 2011/0297268 | A1 | 12/2011 | Hahn et al. | |
| 2012/0067614 | A1 * | 3/2012 | Camp, II | H02G 3/0481 174/103 |
| 2012/0080210 | A1 * | 4/2012 | Camp, II | H01B 11/06 174/34 |

FOREIGN PATENT DOCUMENTS

| | | |
|---|---|---|
| EP | 1589801 A2 | 10/2005 |
| GB | 2172547 A | 9/1986 |
| GB | 2311114 A | 9/1997 |
| WO | 0104531 A1 | 1/2001 |

OTHER PUBLICATIONS

International Search Report, mailed Jun. 7, 2013 (PCT/US2013/025300).

* cited by examiner

THERMALLY RESISTANT CONVOLUTED SLEEVE AND METHOD OF CONSTRUCTION THEREOF

CROSS-REFERENCE TO RELATED APPLICATION

This application claims the benefit of U.S. Provisional Application Ser. No. 61/596,426, filed Feb. 8, 2012, which is incorporated herein by reference in its entirety.

BACKGROUND OF THE INVENTION

1. Technical Field

This invention relates generally to tubular sleeves for protecting elongate members, and more particularly to tubular convoluted sleeves having insulative and reflective properties.

2. Related Art

Tubular sleeves are known for use to protect and provide a barrier to heat from reaching elongate members, e.g. wire harnesses, sensors, and the like, contained within the sleeves, or to prevent heat from radiating outward from a heat source, e.g. pipes. By shielding the elongate members from heat, such as from heat radiating from a nearby heat source, the elongate members are protected against damage from the radiant heat. Likewise, by preventing heat from radiating outwardly from a heat source, nearby components are protected against damage from the radiant heat. Although known sleeves can prove effective in providing the desired protection against thermal effects, they are typically costly in manufacture, and further, they typically have a relatively rigid, incompressible, inflexible wall, thereby providing the sleeve with a limited ability to be both radially compressed and routed over meandering paths without damaging the wall.

A sleeve manufactured in accordance with the invention overcomes or greatly minimizes the tendency of a thermally insulative, reflective textile sleeve from becoming damaged, such as from being bent, crushed or subjected to abrasive elements.

SUMMARY OF THE INVENTION

A thermally insulative, reflective convoluted sleeve is provided for protecting a member against exposure to heat. The sleeve includes a resilient inner layer, an outer layer and a resilient intermediate layer sandwiched between the inner and outer layers. The inner layer is constructed having an inner surface exposed to an inner cavity of the sleeve and the outer layer is constructed having an outer reflective surface exposed to the surrounding environment. The intermediate layer is constructed of an impervious sheet material and is sandwiched in abutment with the inner and outer layers. The inner, outer and intermediate layers are convoluted, thereby providing the sleeve with an enhanced flexibility to be routed over meandering paths.

In accordance with another aspect of the invention, the inner layer and the intermediate layer are bonded to one another with a thermoset adhesive.

In accordance with another aspect of the invention, the inner layer is a fiber reinforced material.

In accordance with another aspect of the invention, the inner layer is a nonwoven material.

In accordance with another aspect of the invention, the inner layer is fiberglass.

In accordance with another aspect of the invention, the intermediate layer is a polyester film.

In accordance with another aspect of the invention, the polyester film is a biaxially-oriented polyethylene terephthalate.

In accordance with another aspect of the invention, the inner layer is a woven material.

In accordance with another aspect of the invention, the outer layer is a metal foil.

In accordance with another aspect of the invention, the outer layer has overlapping regions and non-overlapping regions, wherein the overlapping regions are bonded to one another.

In accordance with another aspect of the invention, the outer layer is not bonded to the intermediate layer and is moveable relative to the intermediate layer.

In accordance with another aspect of the invention, a method of constructing a thermally insulative, reflective convoluted sleeve is provided. The method includes applying a resilient intermediate layer constructed of an impervious sheet to a resilient inner layer to form a tubular configuration with an inner surface of the inner layer being exposed to a cavity of the sleeve. Further, applying an outer layer about the intermediate layer to provide the tubular configuration having the intermediate layer sandwiched between the inner and outer layers with the outer layer having an outer reflective surface exposed to the surrounding environment. Then, forming convolutes in the inner, intermediate and outer layers to provide the tubular configuration with an enhanced flexibility.

In accordance with another aspect of the invention, the method further includes bonding the inner layer and the intermediate layer to one another with a thermoset adhesive.

In accordance with another aspect of the invention, the method further includes providing the inner layer as a nonwoven material.

In accordance with another aspect of the invention, the method further includes providing the inner layer as a woven material.

In accordance with another aspect of the invention, the method further includes providing the intermediate layer as a polyester film.

In accordance with another aspect of the invention, the method further includes providing the outer layer as a metal foil.

In accordance with another aspect of the invention, the method further includes spiral wrapping the outer layer about the intermediate layer and forming overlapped regions of the outer layer that are bonded to one another.

In accordance with another aspect of the invention, the method further includes maintaining the outer layer in non-bonded relation with the intermediate layer.

BRIEF DESCRIPTION OF THE DRAWINGS

These and other aspects, features and advantages of the invention will become readily apparent to those skilled in the art in view of the following detailed description of the presently preferred embodiments and best mode, appended claims, and accompanying drawings, in which:

DETAILED DESCRIPTION OF PREFERRED EMBODIMENTS

Figure 1:
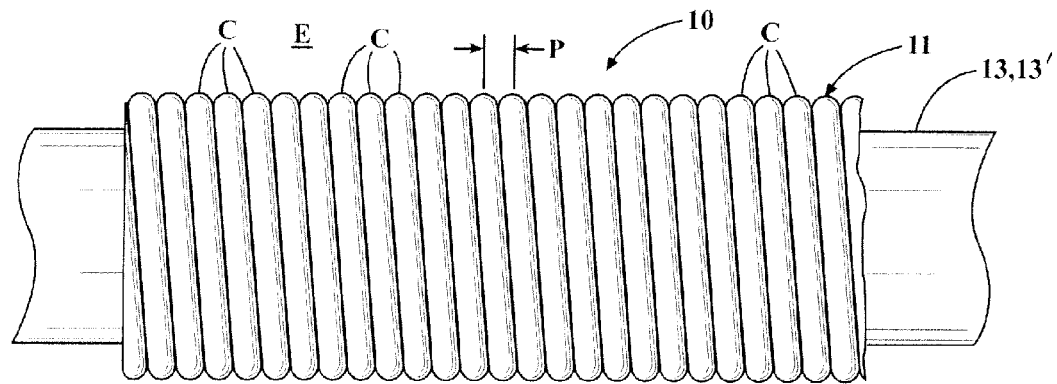
FIG. 1 is a side view of a thermally insulative, reflective convoluted sleeve constructed in accordance with one aspect of the invention shown disposed about an elongate member.

Referring in more detail to the drawings, FIG. 1 illustrates a thermally insulative, reflective convoluted sleeve 10, constructed in accordance with one aspect of the invention, for protecting an elongate member 13, e.g. wires, sensors, against exposure to heat and contaminants, e.g. debris and fluid contamination, and for preventing heat from radiating outwardly from an elongate member 13' being protected, such as a fluid or gas conveying pipe. As best shown in cross-section of FIG. 2, the sleeve 10 includes a resilient wall 11 that may be crushed or otherwise compressed and then resiliently spring back or return to its as constructed tubular configuration without compromising the protective physical properties of the sleeve 10. As such, the sleeve 10 retains is useful shape and functionality even if inadvertently crushed or compressed, such as in storage, during shipment, during routing or while in use. These properties of the wall 11 are provided by an inner layer 12, an outer layer 14 and an intermediate layer 16 sandwiched between the inner and outer layers 12, 14, wherein at least one or more of the layers 12, 14, 16 are resilient.

The inner layer 12 is constructed having an inner surface 18 exposed to an inner cavity 20 of the sleeve 10 and the outer layer 14 is constructed having a reflective outer surface 22 exposed to the surrounding environment E. The intermediate layer 16 is constructed of an imperforate, impervious sheet material and is sandwiched in abutment with the inner and outer layers 12, 14. The inner, outer and intermediate layers 12, 14, 16 are convoluted to provide the wall 11 with convolutes C immediately adjacent one another, thereby providing the sleeve 10 with an enhanced ability to be flexed and routed over meandering paths without becoming damaged or otherwise compromising the functionality of the sleeve 10. The convolutes C contribute to the improved thermal barrier properties of the sleeve 10 by effectively thickening the wall 11 in regions having folded portions of the convolutes C adjacent and abutting, or substantially abutting one another.

Figure 2:
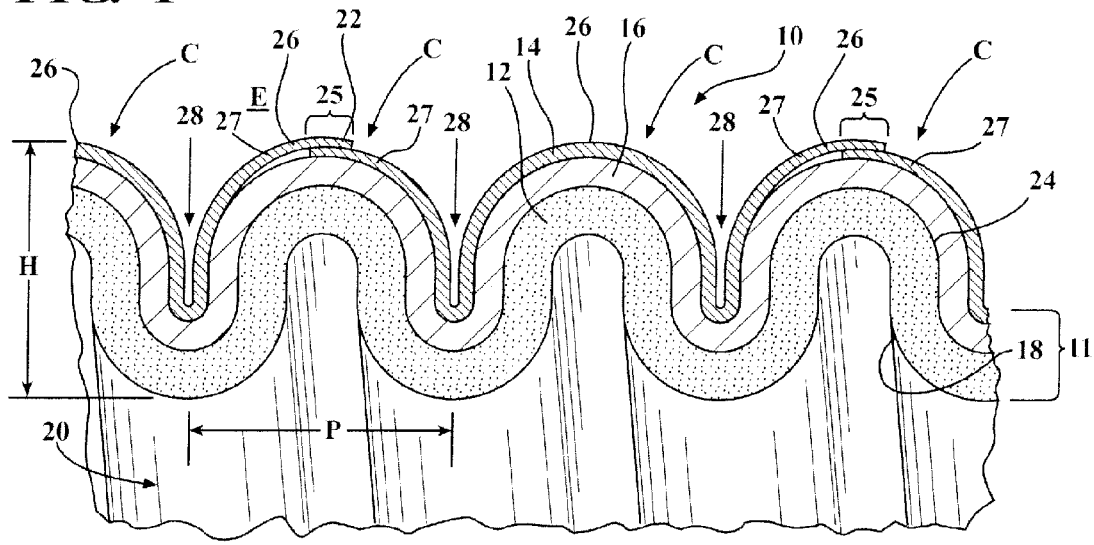
FIG. 2 is a cross-sectional side view taken generally along the line 2-2 of the sleeve of FIG. 1.
Figure 2A:
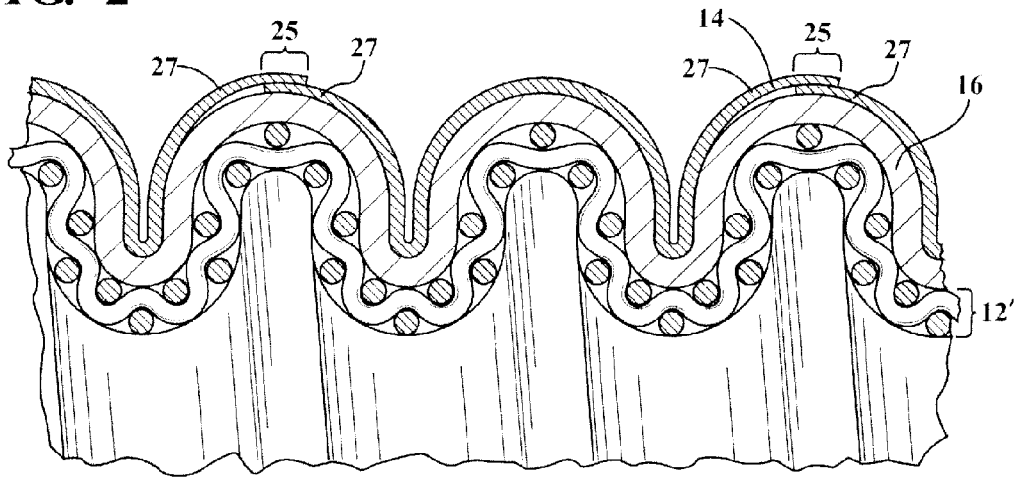
FIG. 2A is a view similar to FIG. 2 of a sleeve constructed in accordance with another aspect of the invention.

The inner layer 12 can be constructed from nonwoven fiber-reinforced material, as shown in FIG. 2. The fiber-reinforced material can be provided as a fiber-reinforced polymeric material, such as polyethylene terephthalate (PET), or from other types of fiber-reinforced materials, such as fiberglass, by way of example and without limitation. Otherwise, as shown in FIG. 2A, an inner layer 12', constructed in accordance with another aspect of the invention, can be constructed as a tightly woven material layer, thereby being free or substantially free of holes.

The intermediate layer 16 is constructed from an imperforate, impervious polymeric film material. The polymeric film material can be provided as a biaxially-oriented polyethylene terephthalate, e.g. Mylar.

The outer layer 14 is constructed from a metallic foil material. The metallic foil material can be provided as a composite lamination, or as a single sheet of metallic material. The metallic foil material can include various types of metal, including steel, iron and/or aluminum. Accordingly, if provided as a composite lamination, at least one metallic material is provided within the lamination, and further, is preferably present on the outer surface 22 to form a reflective surface, thereby facilitating the ability of the sleeve 10 to reflect radiant heat present in the environment E. Otherwise, if provided as a single, monolithic layer, the metallic material can be provided as steel foil, iron foil, or aluminum foil. Regardless of the type of metallic material, the outer layer 14 is provided as a thin layer, thus allowing the outer layer 14 to be readily compressed, while thereafter returning to its original tubular configuration under the bias of the inner and intermediate layers 12, 16. The outer layer 14 is wrapped about the intermediate layer 16 and bonded to itself at overlapping regions 25, such as by being spiral wrapped. The outer layer 14 is coated with an adhesive prior to being wrapped, and thus the overlapping regions 25, upon coming into contact with one another, become adhere to one another. However, remaining non-overlapped regions 27 of the outer layer 14 remain free and non-adhered from the intermediate layer 16 given its slick, non-adhesive properties. Accordingly, the outer layer 14 remains free to move relative to the intermediate layer 16 during use, thereby facilitating its remaining undamaged during application.

In accordance with another aspect of the invention, a method of constructing the sleeve 10 is provided. The method includes, with reference to the layers discussed above, applying the resilient intermediate layer 16 to the inner layer 12 to form a tubular configuration with the inner surface 18 of the inner layer 12 being exposed to bound the inner cavity 20 of the sleeve 10. The inner and intermediate layers 12, 16 are adhered to one another via an adhesive layer, such as a thermoset adhesive layer 24. The thermoset adhesive layer 24 is applied over the entire surface of one of the layers 12, 16 such that the adhesive layer 24 extends over the entire abutting surfaces of the inner and intermediate layers 12, 16.

Upon bonding the inner layer 12 to the intermediate layer 16, the outer layer 14, with an adhesive having been applied to at least one side thereof, is wrapped, such as by being spiral wrapped, about the tubular intermediate layer 16 and fixed to itself at the overlapping regions 25 by the adhesive. Although the adhesive can be applied to the entire surface of the outer layer that abuts the intermediate layer 16, the adhesive in the non-overlapping regions 27 of the outer layer 14 generally does not adhere to the intermediate layer 16 given the slick, non-bonding surface of the intermediate layer 16, and thus, the entire outer layer 14 remains free to slide or otherwise move slightly relative to the underlying intermediate layer 16. Accordingly, improved flexibility can be attained by allowing relative movement between the outer layer 14 and the intermediate layer 16 without causing damage, e.g. tearing, of the thin metallic outer layer 14 during application and during subsequent manufacture processing of the sleeve 10.

Figure 3:
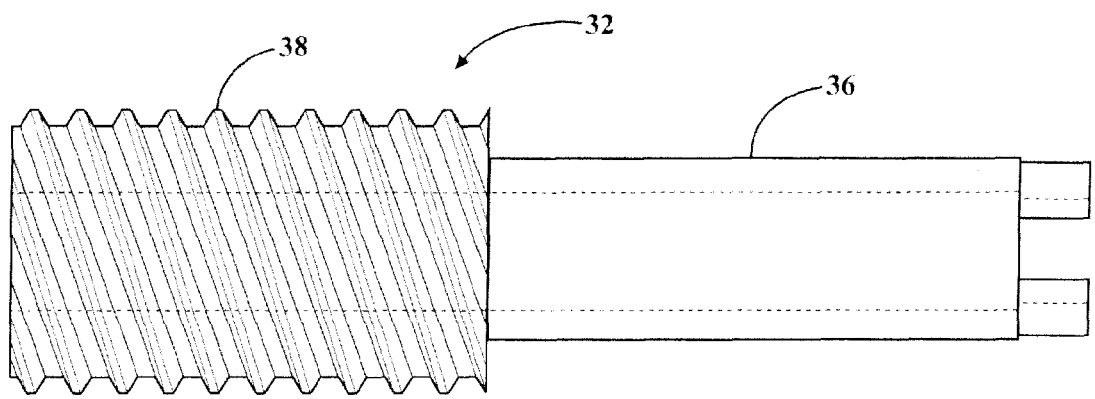
FIG. 3 is a side view of an inner die used in construction of the sleeve of FIG. 1.
Figure 4:
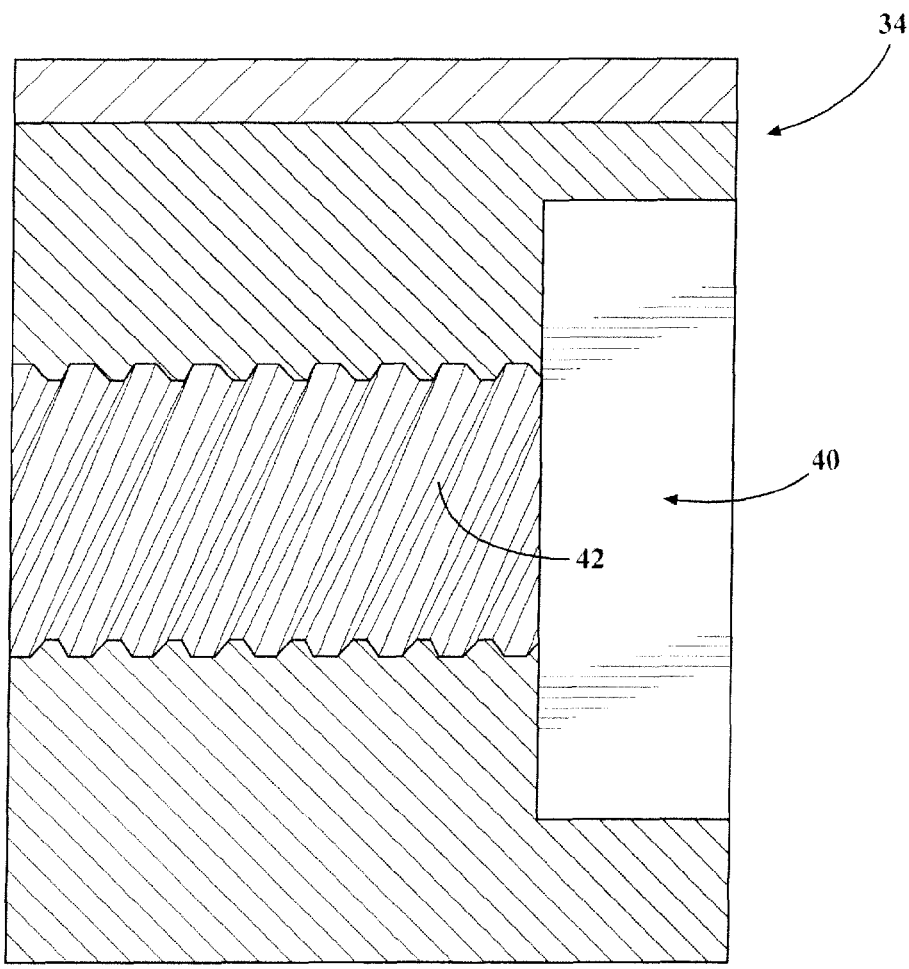
FIG. 4 is a cross-sectional side view of an outer die used in construction of the sleeve of FIG. 1.

Upon applying the resilient outer layer 14 about the tubular construction of the inner and intermediate layers 12, 16, the method further includes forming convolutes C in the inner, outer, and intermediate layers 12, 14, 16 to provide the tubular configuration with an enhanced flexibility, insulative, and thermal barrier properties. The convolutes C are formed by passing the tubular wall 11 between an inner die 32 (FIG. 3) and an outer die 34 (FIG. 4). The inner die 32 is provided as a worm-type die that includes a shaft 36 with at least one external helical male thread 38 (single lead) or a plurality of threads 38 (multiple leads). The outer die 34 is provided as a nut that includes an aperture 40 with at least one inwardly extending helical female thread 42 (single lead) or a plurality of threads 42 (multiple leads). The helical threads 38, 42 are sized to cooperate with one another to form the desired size and pattern of convolutes C, including the desired resulting convolute height (H) and convolute pitch (P). The convolutes C are formed by a plurality of radially outwardly extending crests 26 with intermediate valleys 28 formed between adjacent crests 26. The convolutes C can be formed in a tight configuration, thereby attaining a relatively increased number of corrugations per inch, and having a small pitch P, such that the crests 26 are formed immediately adjacent one another and in abutting or substantially abutting relation one another. As such, the abutting portions of the convolutes C can effectively thicken the wall height, thereby contributing the insulating, thermal barrier properties of the sleeve 10. As such, depending on the characteristics sought, the convolutes C and be formed as desired, including selecting the desired pitch P and height H. It should be recognized that during formation of the convolutes C, the outer layer 14 is free to slide slightly relative to the abutting intermediate layer 16, and thus, tearing of the thin outer layer 14 is prevented.

It is to be understood that the above detailed description is with regard to some presently preferred embodiments, and that other embodiments readily discernible from the disclosure herein by those having ordinary skill in the art are incorporated herein and considered to be within the scope of any ultimately allowed claims.

What is claimed is:

1. A thermally insulative, reflective sleeve for protecting a member against exposure to heat, comprising:
    a resilient textile tubular inner layer having an inner surface exposed to a cavity of the sleeve, said inner layer being one of a nonwoven textile material or a woven textile material;
    a resilient tubular outer layer having an outer reflective surface exposed to the surrounding environment;
    a resilient tubular intermediate layer constructed of an impervious sheet material sandwiched between said inner and outer layers; and
    said inner, outer and intermediate layers being resiliently, radially compressible and expandable and convoluted to provide the sleeve with an enhanced flexibility to be routed over meandering paths.

2. The thermally insulative, reflective convoluted sleeve of claim 1 wherein said inner layer and said intermediate layer are bonded to one another with a thermoset adhesive.

3. The thermally insulative, reflective convoluted sleeve of claim 1 wherein said inner layer is a fiber reinforced textile material.

4. The thermally insulative, reflective convoluted sleeve of claim 3 wherein said inner layer is a nonwoven textile material.

5. The thermally insulative, reflective convoluted sleeve of claim 1 wherein said inner layer is fiberglass.

6. The thermally insulative, reflective convoluted sleeve of claim 1 wherein said intermediate layer is a polyester film.

7. The thermally insulative, reflective convoluted sleeve of claim 6 wherein said polyester film is a biaxially-oriented polyethylene terephthalate.

8. The thermally insulative, reflective convoluted sleeve of claim 1 wherein said outer layer is a metal foil.

9. The thermally insulative, reflective convoluted sleeve of claim 8 wherein said metal foil is a composite lamination.

10. The thermally insulative, reflective convoluted sleeve of claim 1 wherein said outer layer has overlapping regions and non-overlapping regions, said overlapping regions being bonded to one another.

11. The thermally insulative, reflective convoluted sleeve of claim 10 wherein said outer layer is not bonded to said intermediate layer and is moveable relative to said intermediate layer.

12. The thermally insulative, reflective convoluted sleeve of claim 1 wherein said inner layer is a woven material.

13. A method of constructing a thermally insulative, reflective convoluted sleeve, comprising:
    applying a resilient intermediate layer constructed of an impervious sheet to a resilient textile inner layer to form a tubular configuration with an inner surface of the textile inner layer being exposed to a cavity of the sleeve;
    applying an outer layer about the intermediate layer to form the tubular configuration having the intermediate layer sandwiched between the inner and outer layers with the outer layer having an outer reflective surface exposed to the surrounding environment; and
    simultaneously forming convolutes in the inner, intermediate and outer layers to provide the tubular configuration with an enhanced flexibility.

14. The method of claim 13 further including bonding the inner layer and the intermediate layer to one another with a thermoset adhesive.

15. The method of claim 13 further including providing the inner layer as a textile nonwoven material.

16. The method of claim 13 further including providing the inner layer as a woven material.

17. The method of claim 13 further including providing the intermediate layer as a polyester film.

18. The method of claim 13 further including providing the outer layer as a metal foil.

19. The method of claim 13 further including spiral wrapping the outer layer about the intermediate layer and forming overlapped regions of the outer layer that overlap one another.

20. The method of claim 19 further including bonding the overlapped regions to one another with an adhesive.

21. The method of claim 20 further including maintaining the outer layer in non-bonded relation with the intermediate layer.

* * * * *